United States Patent
Singh et al.

(10) Patent No.: US 12,019,505 B2
(45) Date of Patent: Jun. 25, 2024

(54) EVENT-BASED DIAGNOSTIC INFORMATION COLLECTION

(71) Applicant: VMware LLC, Palo Alto, CA (US)

(72) Inventors: Randhir Singh, Bangalore (IN); Kashish Bhatia, Bangalore (IN)

(73) Assignee: VMware LLC, Palo Alto, CA (US)

( * ) Notice: Subject to any disclaimer, the term of this patent is extended or adjusted under 35 U.S.C. 154(b) by 5 days.

(21) Appl. No.: 17/965,815

(22) Filed: Oct. 14, 2022

(65) Prior Publication Data

US 2024/0028443 A1    Jan. 25, 2024

(30) Foreign Application Priority Data

Jul. 21, 2022    (IN) ............................. 202241041819

(51) Int. Cl.
  *G06F 11/00* (2006.01)
  *G06F 9/54* (2006.01)
  *G06F 11/07* (2006.01)

(52) U.S. Cl.
  CPC ............ *G06F 11/079* (2013.01); *G06F 9/542* (2013.01); *G06F 11/0766* (2013.01)

(58) Field of Classification Search
  CPC ......... H04L 67/02; H04L 67/10; H04L 67/51; H04L 67/125; G06F 11/0766–0787; G06F 11/079
  See application file for complete search history.

(56) References Cited

U.S. PATENT DOCUMENTS

| | | | |
|---|---|---|---|
| 5,872,966 A * | 2/1999 | Burg .................. | G06F 11/0709 719/321 |
| 2017/0279702 A1* | 9/2017 | Mah .................... | G06F 11/0748 |

OTHER PUBLICATIONS vSphere Monitoring and Performance, Update 2, Modified on Jan. 18, 2024 (Year: 2024).*

* cited by examiner

*Primary Examiner* — Michael Maskulinski
(74) *Attorney, Agent, or Firm* — Quarles & Brady LLP

(57) ABSTRACT

An example computing device includes a processor and a memory coupled to the processor. The memory may include a diagnostic daemon executing in a user space. The diagnostic daemon may include a plugin layer and a plurality of plugins communicatively connected to the plugin layer. Each plugin may perform at least one operation related to diagnostic data collection. The plugin layer may receive an event from a component running in the computing device upon the component encountering an error. The event may include a plugin identifier and an operation identifier. Further, the plugin layer may route the event to a plugin of the plurality of plugins based on the plugin identifier. Furthermore, the plugin may determine an operation to be performed corresponding to the component based on the operation identifier and execute the operation to collect a type of diagnostic information specified for the component.

20 Claims, 5 Drawing Sheets

```
{
  {
    plugin_name : <name 1>              — 202
    plugin_ID   : <plugin ID 2>         — 204
        operations: {
            Op : {
                ID : <operation ID 1>              — 206
                command: <diagnostic command>      — 208
                log_location : <loc>               — 210
                enable : <True/False>              — 212
            },
            .....
    }
}
```

EVENT-BASED DIAGNOSTIC INFORMATION COLLECTION

RELATED APPLICATIONS

Benefit is claimed under 35 U.S.C. 119(a)-(d) to Foreign Application Serial No. 202241041819 filed in India entitled "EVENT-BASED DIAGNOSTIC INFORMATION COLLECTION", on Jul. 21, 2022, by VMware, Inc., which is herein incorporated in its entirety by reference for all purposes.

TECHNICAL FIELD

The present disclosure relates to computing environments, and more particularly to methods, techniques, and systems for collecting event-based diagnostic information of a component running in a computing device of a computing environment.

BACKGROUND

Virtualization allows an abstraction of hardware resources and the pooling of these resources to support multiple virtual machines. For example, through virtualization, virtual machines with different operating systems may be run on the same physical machine. Each virtual machine is provisioned with virtual resources that provide similar functions as the physical hardware of a physical machine, such as central processing unit (CPU), memory, and network resources to run an operating system and different applications. An example implementation of virtual machines is to run a virtual desktop. In such virtualized environments, the operations of the physical machine and/or the components running in the physical machine may be monitored to diagnose any issues and enhance the performance of the physical machine.

For example, errors frequently arise during the execution of processes on the physical machine. Some errors can be serious (e.g., errors that halt the execution of the processes or disrupt other processes on the physical machine), while other errors may persist undetected and cause problems at a later point. In order to diagnose these errors, the physical machines and/or computing environments (e.g., operating systems and/or applications) may generate error messages (e.g., diagnostic information) associated with such errors and store the error messages in log files that are stored locally on the physical machine.

BRIEF DESCRIPTION OF THE DRAWINGS

FIG. 2 is an example configuration file of FIG. 1, depicting a set of operations supported by a plugin;

Figure 1:
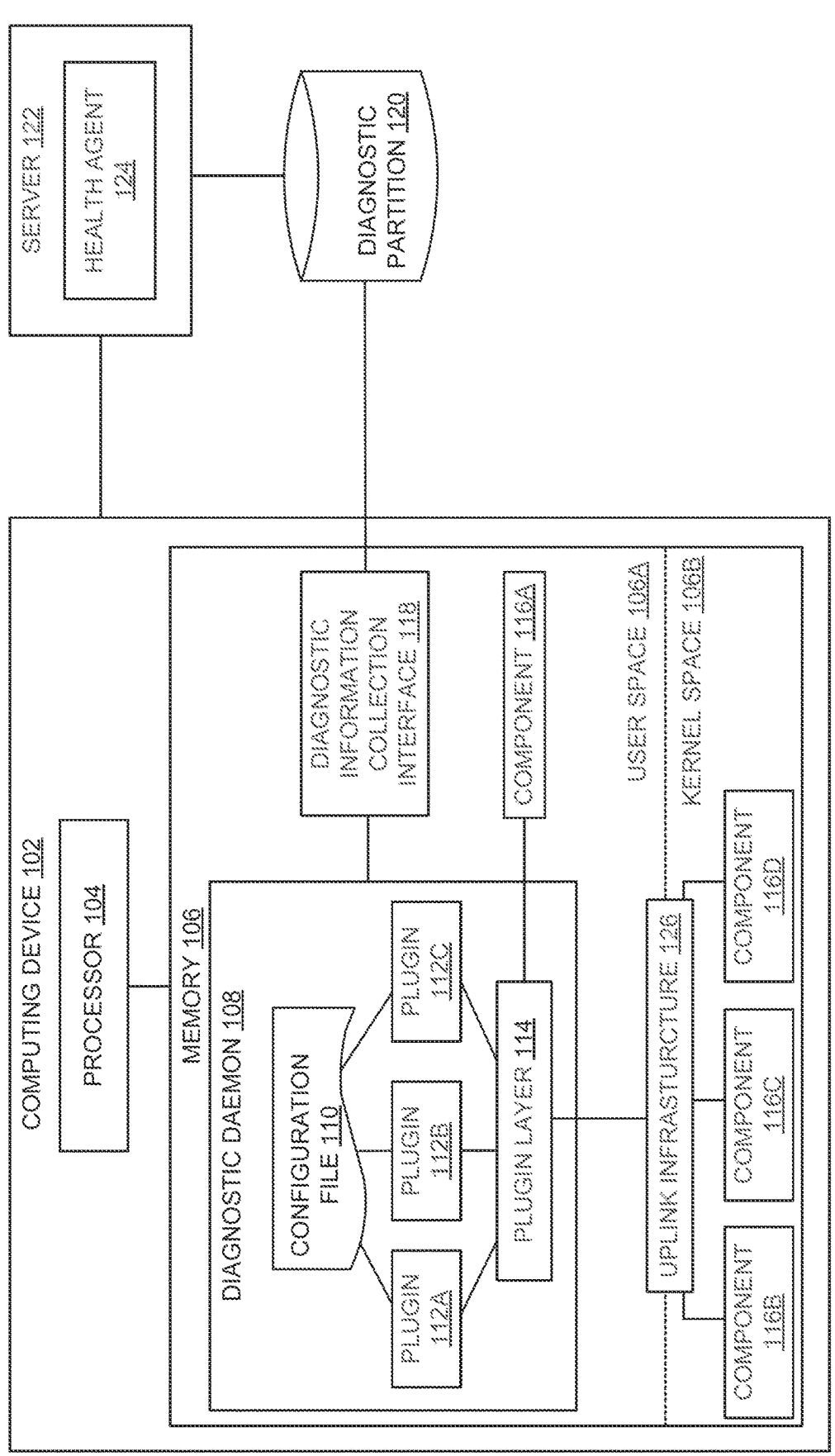
FIG. 1 is a block diagram of an example system, depicting a diagnostic daemon to collect diagnostic information specified for a component in a computing device.

The drawings described herein are for illustrative purposes and are not intended to limit the scope of the present subject matter in any way.

DETAILED DESCRIPTION

Examples described herein may provide an enhanced computer-based and/or network-based method, technique, and system to collect event-based diagnostic information of a component in a computing device. The paragraphs to present an overview of high availability computing devices, existing methods of collecting debugging information for issues related to computing device operations, and drawbacks associated with the existing methods.

A high availability system is a system that is resilient to failures of the system's components. This can be achieved by providing redundant components so that if one component fails, a redundant component can take over performing the tasks of the failed component. Similarly, high availability computing devices can be grouped into clusters. The computing devices in a cluster may work as a team to provide services even if some of the computing devices fail. For example, as long as at least one of the computing devices in a cluster remains active, the cluster may provide the services configured on the computing devices. Examples of the services may include load balancing, traffic forwarding, data packet processing, virtual private network (VPN) services, domain name system (DNS) services, and the like. Computing devices in a cluster may operate in either an active mode or a standby mode. If a computing device in a cluster fails, then, if possible, a surviving computing device assumes an active role and provides the services that were configured on the failed computing device.

A computing device may be a server residing in a data center of an enterprise (or a third-party service provider) to host virtual machines (e.g., virtual desktops). An example computing device may be VMware Elastic Sky X Integrated (ESXi) server for deploying and serving virtual computers. ESXi is a type-1 hypervisor, which runs directly on system hardware without the need for an operating system (OS). Type-1 hypervisors are also referred to as bare-metal hypervisors because they run directly on hardware. As a type-1 hypervisor, ESXi is not a software application that is installed on an OS, instead, the ESXi includes and integrates vital OS components, such as a kernel.

Monitoring such computing devices may be critical, particularly in a software-as-a-service environment, where the computing device may have to be resilient to errors and provide high availability. The software-as-a-service (SaaS) is a software distribution model in which a cloud provider hosts applications and makes them available to end users over a network. Such a high availability computing device may handle the errors gracefully and continues to perform the services. However, such errors have to be diagnosed to improve the performance of the computing device over time.

Unfortunately, detecting failures of the computing devices in the clusters is often inefficient and difficult. For example, the diagnostic information is collected and analyzed at a later point in time after the occurrence of the issue. However, to improve the performance of the computing device, the relevant and contextual diagnostic information associated with the issues related to computing device operations may have to be collected at the time of issue and collecting the diagnostic information at a later point in time may not be useful.

Examples described herein may provide a computing device including a diagnostic daemon to automatically collect diagnostic information for relevant errors at the time of issue. The diagnostic daemon may include a plugin layer and a plurality of plugins communicatively connected to the plugin layer. Each plugin may perform at least one operation related to diagnostic data collection. Upon a component running in the computing device encountering an error, the plugin layer may receive an event from the component running in the computing device. The event may include a plugin identifier and an operation identifier. Further, the plugin layer may route the event to a plugin of the plurality of plugins based on the plugin identifier. Furthermore, the plugin may determine an operation to be performed corresponding to the component based on the operation identifier and execute the operation to collect a type of diagnostic information specified for the component. Thus, examples described herein may provide an approach to collect the relevant and contextual debugging information for various components (e.g., kernel modules and user applications) running in the computing device, which can be used to enhance the availability of the computing device and thus provide better support quality for customers.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

FIG. 1 is a block diagram of an example system 100, depicting a diagnostic daemon 108 to collect diagnostic information specified for a component (e.g., components 116A-116D) in a computing device 102. System 100 may include one or more host computing devices (e.g., computing device 102) and a server 122 to monitor the computing devices via a network to diagnose any issues.

In some examples, computing device 102 may be configured to provide a virtualization layer that abstracts processor, memory, storage, and networking resources of a hardware platform into multiple virtual machines (VMs) that run concurrently on computing device 102. The VMs may run on top of a software interface layer, referred to herein as a hypervisor, which enables sharing of the hardware resources of computing device 102 by the VMs. One example of the hypervisor described herein is a VMware ESXi™, which is VMware's virtual machine monitor to create and run the VMs. The hypervisor may run on top of an operating system of computing device 102 or directly on hardware components of computing device 102. Although some examples are described herein with respect to the VMs, it should be understood that principles and techniques disclosed herein may also be used with other appropriate virtual computing instances (e.g., containers (e.g., Docker containers), data compute nodes, isolated user space instances, namespace containers, and/or the like). In an example, computing device 102 may reside in a data center of an enterprise (or a third-party service provider) to host the VMs (e.g., virtual desktops).

An example network can be a managed Internet protocol (IP) network administered by a service provider. For example, the network may be implemented using wireless protocols and technologies, such as Wi-Fi, WiMax, and the like. In other examples, the network can also be a packet-switched network such as a local area network, wide area network, metropolitan area network, Internet network, or other similar type of network environment. In yet other examples, the network may be a fixed wireless network, a wireless local area network (LAN), a wireless wide area network (WAN), a personal area network (PAN), a virtual private network (VPN), intranet or other suitable network system and includes equipment for receiving and transmitting signals.

Further, system 100 may include diagnostic partition 120 (e.g., a dump partition) residing in an internal storage device (e.g., a hard drive) of computing device 102 or in an external storage device accessible to computing device 102 via the network. Diagnostic partition 120 may be used to store collected diagnostic information for debugging and technical support. In the example shown in FIG. 1, diagnostic partition 120 may store diagnostic information such as core dump collected from computing device 102.

As shown in FIG. 1, computing device 102 includes a processor 104. The term "processor" may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 104 may, for example, include single or multiple cores on a chip, multiple cores across multiple chips, multiple cores across multiple devices, or suitable combinations thereof. Processor 104 may be functional to fetch, decode, and execute instructions as described herein.

Further, computing device 102 includes a memory 106 coupled to processor 104. Memory 106 may be a device allowing information, such as executable instructions, cryptographic keys, configurations, and other data, to be stored and retrieved. Memory 106 is where programs and data are kept when processor 104 is actively using them. Memory 106 may include, for example, one or more random access memory (RAM) modules. As shown in FIG. 1, memory 106 may be segregated into a user space 106A and a kernel space 106B to provide memory protection and hardware protection from malicious or errant software behavior. For example, user space 106A is a memory area where application software and drivers execute, and kernel space 106B is reserved for running operating system components such as an operating system kernel, kernel extensions, and device drivers. Kernel space 106B may be a protected area of memory 106 preventing the protected area from being overwritten by applications or other parts of the operating system. For example, kernel space 106B may include a kernel program that connects application software in user space 106A to the hardware of the computing device 102. The kernel program performs tasks, such as running processes and handling interrupts, in kernel space 106B. In contrast, anything user-related usually happens in user space 106A.

Further, memory 106 includes a plurality of components 116A-116D, with each component running in either user space 106A or kernel space 106B. In the example shown in FIG. 1, component 116A is a user space component executing in user space 106A and components 116B-116D are kernel space components executing in kernel space 106B.

Further, memory 106 includes diagnostic daemon 108 executing in user space 106A. Diagnostic daemon 108 may refer to a lightweight process which listens to uplink calls coming from the kernel space components (e.g., components 116B-116D). Also, diagnostic daemon 108 can accept requests from the user space components (e.g., component 116A) through a message passing protocol.

Furthermore, memory 106 includes an uplink infrastructure 126 that enables the kernel space components to make the uplink calls. An uplink call may be a reverse notification mechanism to notify diagnostic daemon 108 running in user space 106A from components 116B-116D running in kernel space 106B. Further, each component 116A-116D may specify details of a service requested, that includes a set of diagnostic information to be collected at a time when the component encounters an error.

Furthermore, diagnostic daemon 108 includes a plugin layer 114 and a plurality of plugins 112A-112C communicatively connected to plugin layer 114. Plugin layer 114 may receive requests from components 116A-116D and redirect the requests to a respective one of plugins 112A-112C. Further, each plugin 112A-112C may perform at least one operation related to diagnostic data collection. In an example, diagnostic daemon 108 may create an instance of a plugin (i.e., plugin 112A, 112B, or 112C) which listens to uplink calls/message passing protocols from the components 116A-116D and triggers a collection of diagnostic information configured for the components 116A-116D.

Further, memory 106 include a configuration file 110 to store the information related to set of operations supported by each plugin. Using configuration file 110, diagnostic daemon 108 may create plugin instances during registration. When diagnostic daemon 108 is loaded, diagnostic daemon 108 can take specifications for generic plugins and module-specific plugins from configuration file 110. Using such specifications, diagnostic daemon 108 can create separate plugins to handle generic requests and module-specific requests. An example configuration file 110 is depicted in FIG. 2.

For example, diagnostic daemon 108 may create plurality of plugins 112A-112C based on plugin configuration specified in configuration file 110. Each created plugin may receive an event from at least one component via an application programming interface (API). The API may be built into computing device 102 to enable kernel space components (e.g., VM kernel modules) and user space components (e.g., user processes) to make requests for the diagnostic data collection. Example API may include an uplink call or a message passing protocol. Further, diagnostic daemon 108 may assign a plugin identifier to each of plurality of plugins 112A-112C. In an example, components 116A-116D can route requests to a specific plugin using the plugin identifier.

In the example shown in FIG. 1, plugin 112A may be a generic plugin offering common services to components 116B and 116C. In this example, requests from components 116B and 116C are redirected to plugin 112A by plugin layer 114. Thus, plugin 112A may offer the diagnostic data collection for areas which can be common to components 116B and 116C. Such generic plugins can be called by any component of computing device 102. Further, plugin 112B and plugin 112C may be the specific plugins offering services to component 116A and component 116D, respectively. For example, when a component-specific request is received from component 116D, plugin layer 114 may route the request to plugin 112C. Similarly, component 116A (e.g., user application) can request diagnostic daemon 108 to collect the diagnostic information through plugin 112B.

During operation, plugin layer 114 may receive an event (i.e., a request) from a component (e.g., 116C) running in computing device 102 upon the component encountering an error. The event may include a plugin identifier and an operation identifier. In an example scenario where the component executes in kernel space 106B, diagnostic daemon 108 may receive the event from the component executing in kernel space 106B via an uplink call from the component to diagnostic daemon 108. The uplink call may be a reverse notification mechanism to notify a user space program (i.e., plugin layer 114) from kernel space 106B. In another example scenario where the component executes in user space 106A, diagnostic daemon 108 may receive the event from the component executing in user space 106A via a message passing protocol. The message passing protocol may allow user space components to read and/or write data to a message queue without being connected to each other.

Further, plugin layer 114 may route the event to a plugin of plurality of plugins 112A-112C based on the plugin identifier. For example, the plugin may be a generic plugin providing a common service for a set of components (e.g., components 116A-116D) including the component or a component-specific plugin providing services specific to a component (e.g., component 116D). Furthermore, the plugin may determine an operation to be performed corresponding to the component based on the operation identifier. Further, the plugin may execute the operation to collect a type of diagnostic information specified for the component. The diagnostic information may include a point-in-time state of computing device 102 at the time of the error.

Further in operation, the plugin may store the collected diagnostic information in diagnostic partition 120 specified in configuration file 110 via a diagnostic information collection interface 118. In an example, configuration file 110 may store information related to at least one operation supported by each plugin in plurality of plugins 112A-112C. Each operation may be associated with an operation identifier. Further, diagnostic daemon 108 may determine the operation to be performed corresponding to the component by looking-up the operation identifier in configuration file 110.

Example diagnostic partition 120 may be a disk space to store the diagnostic information for debugging. Diagnostic information collection interface 118 may be a predefined command interface to collect information such as a state of central processing unit registers and associated in-memory data related to kernel space and user space components. Thus, diagnostic information collection interface 118 collects the point-in-time state of computing device 102 and store the point-in-time state of computing device 102 in diagnostic partition 120. In some examples, diagnostic partition 120 may be a predefined partition in computing device 102 to store the diagnostic information.

Furthermore, diagnostic daemon 108 may send a notification indicating a location of diagnostic partition 120 to a health agent 124 residing in server 122. Health agent 124 may fetch the diagnostic information from diagnostic partition 120 to monitor health of computing device 102 at the time when the component encounters the error. In an example use case, integrating diagnostic daemon 108 with health services and customer experience improvement programs (CEIPs) can be helpful by alarming the customers and software-as-a-service (SaaS) providers of possible critical events and allowing them to take necessary actions.

In other examples, diagnostic daemon 108 may store the received event including the plugin identifier and the operation identifier in configuration file 110. Configuration file 110 may be shared between plugins 112A-112C that are registered to diagnostic daemon 108. In response to receiving a second event from a second component (e.g., the second event occurs at the same time as the first event), diagnostic daemon 108 may map the collected diagnostic information in diagnostic partition 120 to the second component based on the stored event. Thus, the collected diagnostic information associated with one event can be mapped to other events occurring at a substantially same time to avoid storing duplicate copies of the diagnostic information.

Thus, examples described herein may provide a method to collect event-based diagnostic information by the kernel and user applications. The events may be generated based upon different error conditions encountered by the components (i.e., modules/applications). Further, the events may be forwarded to a diagnostic service to update debugging collection information. Thus, examples described herein may provide a method to automatically collect the diagnostic information from the computing device to cloud analytics servers via a CEIP, which can enable developers to get insights into real-time issues.

FIG. 2 is an example configuration file 110 of FIG. 1, depicting a set of operations supported by a plugin (e.g., plugin 112B of FIG. 1A). Similarly named elements of FIG. 2 may be similar in structure and/or function to elements described in FIG. 1. Configuration file 110 can be specified using any of the standard formats for configuration. In the example shown in FIG. 2, configuration file 110 is specified using a JavaScript Object Notation (JSON) format. A key defines an attribute and a value defines an identifier given to the attribute.

In the example shown in FIG. 2, a plugin name 202 may indicate a name of a plugin instance (e.g., plugin 112B of FIG. 1A) and a plugin identifier 204 may indicate a unique identifier associated with the plugin instance. Operation identifiers (e.g., operation identifier 206) are set of values which represents a type of operation the plugin instance may have to execute to collect the diagnostic information. An example operation identifier is unique across the plugins. A diagnostic command 208 may be an operation to be performed to collect the diagnostic information. Further, log location 210 may be a location in the diagnostic partition where the logs (i.e., diagnostic information) related to the operation can persist. Furthermore, 'enable' (e.g., 212) may be a flag to enable or disable a particular operation for the plugin instance.

During operation, a diagnostic daemon (e.g., diagnostic daemon 108 of FIG. 1) may read an on-disk configuration file 110 and create the plugin instance with given plugin identifier 204 and with a specified set of operations (e.g., operation identifier 206). In an example, configuration file 110 may be shared between the plugins registered to the diagnostic daemon. Further, configuration file 110 may be persisted on a disk (e.g., a non-volatile storage device). In another example, configuration file 110 may be cached in a memory of a computing device for faster access to diagnostic daemon 108.

Figure 3:
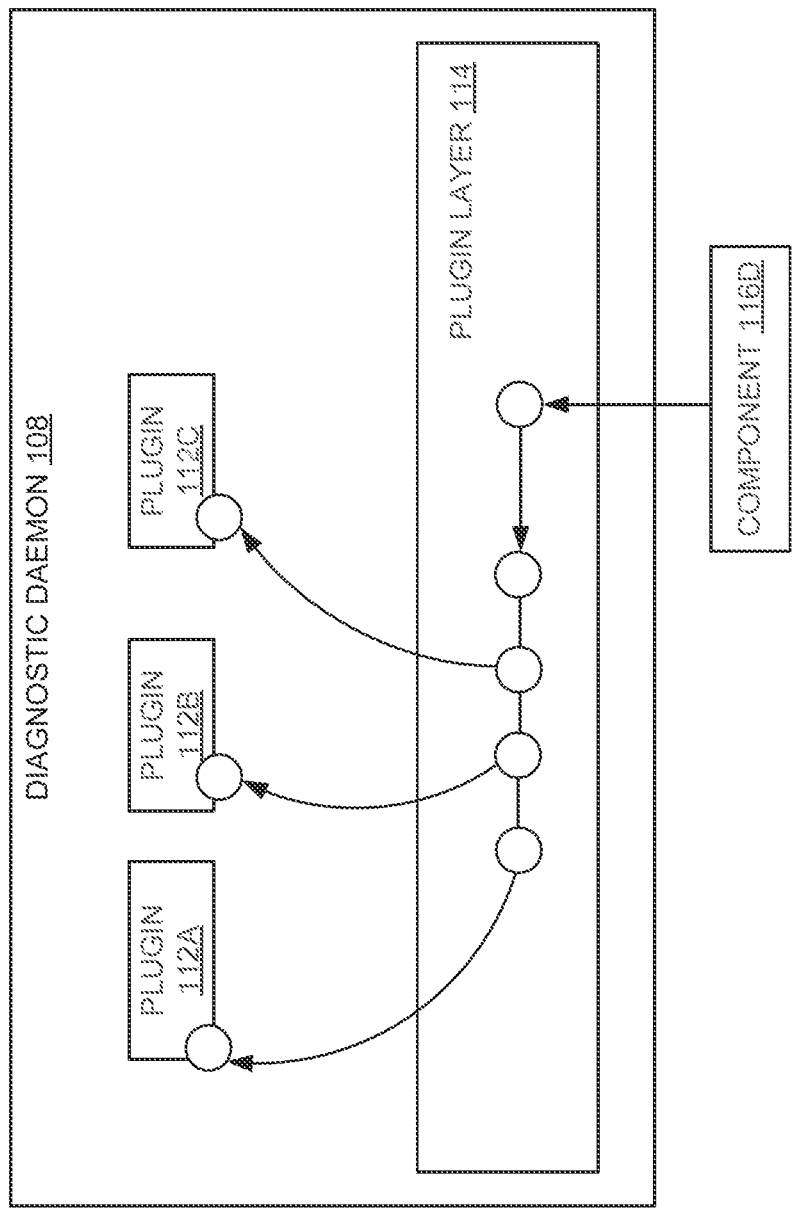
FIG. 3 is a block diagram of an example diagnostic daemon, including a plugin layer to redirect requests to respective plugins using a queue.

FIG. 3 is a block diagram of an example diagnostic daemon 108, including a plugin layer 114 to redirect requests to respective plugins 112A-112C using a queue. Similarly named elements of FIG. 3 may be similar in structure and/or function to elements described in FIG. 1. As shown in FIG. 3, diagnostic daemon 108 includes plugin layer 114, which may be a thin layer between plugins 112A-112C and components (e.g., component 116D) registered with diagnostic daemon 108. In an example, plugin layer 114 may redirect the requests received from component 116D to respective one of plugins 112A-112C.

In an example, plugin layer 114 may follow a basic producer-consumer data structure like a queue. For example, the requests from the components (e.g., component 116D) are inserted into a rear end of the queue. Further, plugin layer 114 may dequeue one request at a time, look up a plugin identifier for the requested component, and send a notification to respective plugin (e.g., one of plugins 112A-112C) to execute the requested operation as shown in FIG. 3.

To collect diagnostic information:

At time of an anomaly such as memory leak or unexpected code path, component 116D can invoke diagnostic daemon 108 through an uplink call. During invocation, component 116D may send a request with a plugin identifier and an operation identifier.

The request is received by plugin layer 114 in the queue. Further, plugin layer 114 may determine a corresponding plugin (e.g., plugin 112C) for component 116D by searching the plugin identifier for component 116D.

Using the plugin identifier, generic plugin layer 114 may send a notification to plugin 112C to execute a given operation.

Plugin 112C may refer to a configuration file and matches a type of information component 116D is requested. Based on the operation identifier, if the operation is enabled and supported, plugin 112C may invoke the diagnostic command available corresponding to the operation to trigger the collection of the diagnostic information.

Further, the collected diagnostic information may be stored in a location within a diagnostic partition specified in the configuration file. In an example, the diagnostic information may be collected asynchronously using the diagnostic command interfaces without interrupting requested component 116D. Further diagnostic daemon 108 may send a notification to different health agents such as a vCenter, vSAN health service, cloud services, and the like, so that the health agents can fetch the diagnostic information from the diagnostic partition for analysis.

Figure 4:
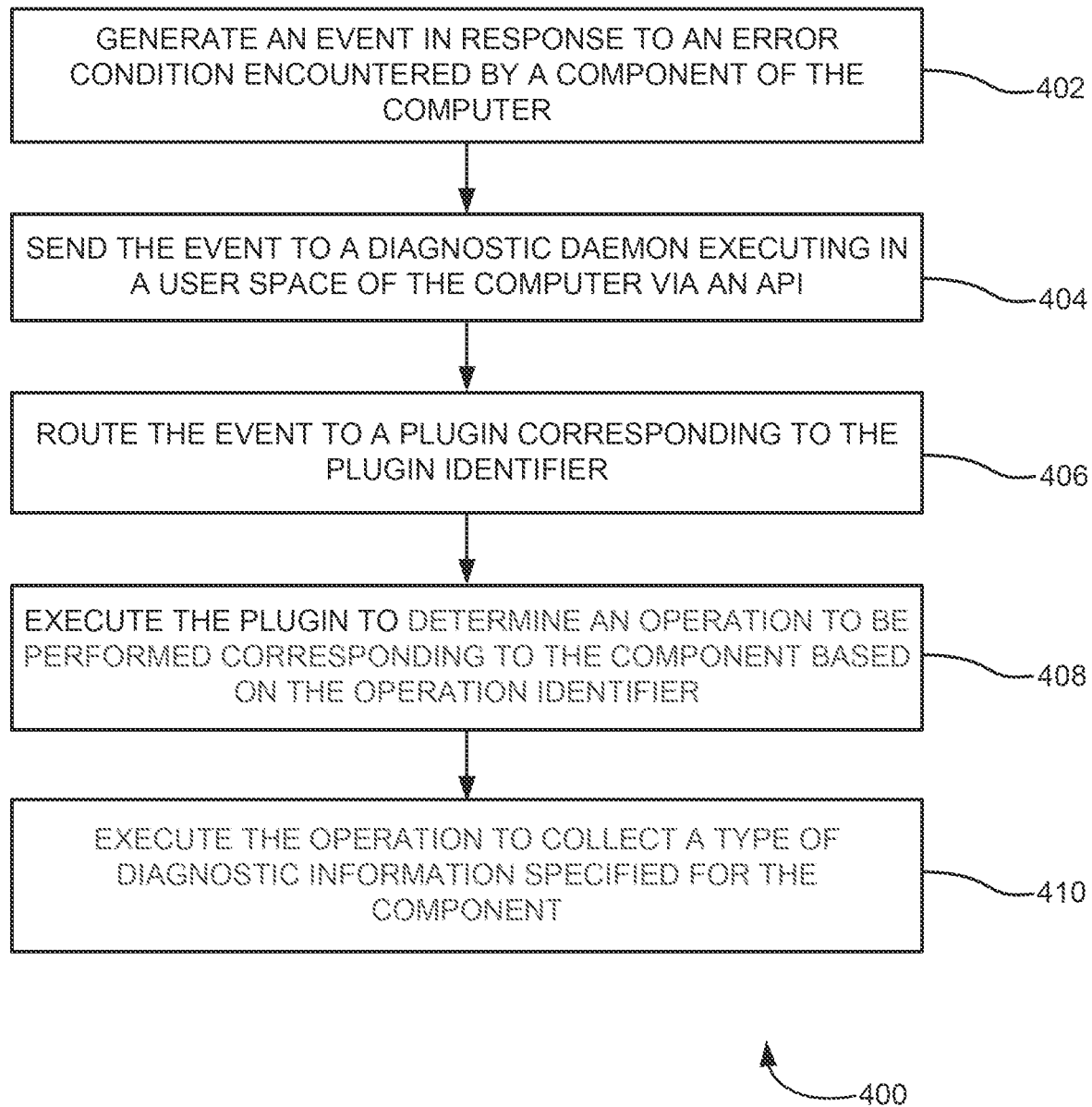
FIG. 4 is a flow diagram, illustrating an example method for collecting diagnostic information of a component executing in a computer.

FIG. 4 is a flow diagram illustrating an example method 400 for collecting diagnostic information of a component executing in a computer. Example method 400 depicted in FIG. 4 represents generalized illustrations, and other processes may be added, or existing processes may be removed, modified, or rearranged without departing from the scope and spirit of the present application. In addition, method 400 may represent instructions stored on a computer-readable storage medium that, when executed, may cause a processor to respond, to perform actions, to change states, and/or to make decisions. Alternatively, method 400 may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but the flow chart illustrates functional information to design/fabricate circuits, generate computer-readable instructions, or use a combination of hardware and computer-readable instructions to perform the illustrated processes.

At 402, an event may be generated in response to an error condition encountered by the component of the computer. The event may include a plugin identifier and an operation identifier. In an example, the component may execute in a kernel space of the computer or in a user space of the computer.

At 404, the event may be sent to a diagnostic daemon executing in a user space of the computer via an application programming interface (API). In some examples, the plugin may be registered with the diagnostic daemon. For example, registering the plugin with the diagnostic daemon may include:

placing a configuration file in a location accessible to the diagnostic daemon, creating, by the diagnostic daemon, a plugin for each plugin configuration specified in the configuration file, assigning, by the diagnostic daemon, a plugin identifier defined in the configuration file to each created plugin, and assigning, by the diagnostic daemon, an operation identifier defined in the configuration file to each operation related to the diagnostic information collection supported by each plugin.

For example, the diagnostic daemon, upon loading into the computer's memory, can take the specifications for generic plugins and module-specific plugins. Using such specifications, the diagnostic daemon can form separate plugins to handle generic requests and module-specific requests. Further, the registration of a plugin can be done by placing the configuration file to a predefined location known to the diagnostic daemon. Furthermore, the diagnostic daemon may form a dedicated plugin for each plugin configuration specified in the configuration file. An example plugin instance may be assigned with a statically defined plugin identifier mentioned in the configuration file. Further, while registering, the configuration file may provide details of diagnostic information the component requests the diagnostic daemon to collect on the component's behalf. Each type of diagnostic information may be associated with the predefined operation identifier. Furthermore, to request the service offered by the plugin, the component can call an application programming interface (API) specifying the plugin identifier and the operation identifier. In an example, the operation identifier and the plugin identifier may be shared with the diagnostic daemon using a memory provided by the API.

At 406, the event may be routed by the diagnostic daemon to a plugin corresponding to the plugin identifier. The plugin may support at least one operation related to diagnostic data collection. In an example, routing the event to the plugin corresponding to the plugin identifier may include:

receiving, via a plugin layer of the diagnostic daemon, the event from the component, and routing, via the plugin layer, the event to the plugin corresponding to the plugin identifier.

At 408, the plugin may be executed by the diagnostic daemon to determine an operation to be performed corresponding to the component based on the operation identifier. In an example, the operation to be performed corresponding to the component may be determined using a configuration file that stores mapping data between operation identifiers and operations related to the diagnostic data collection.

At 410, the plugin may be executed by the diagnostic daemon to execute the operation to collect a type of diagnostic information specified for the component. Further, method 400 may execute the plugin to access the configuration file to identify a location of the diagnostic partition. Furthermore, the plugin may be executed to store the collected diagnostic information specified for the component in the location specified in the configuration file.

Figure 5:
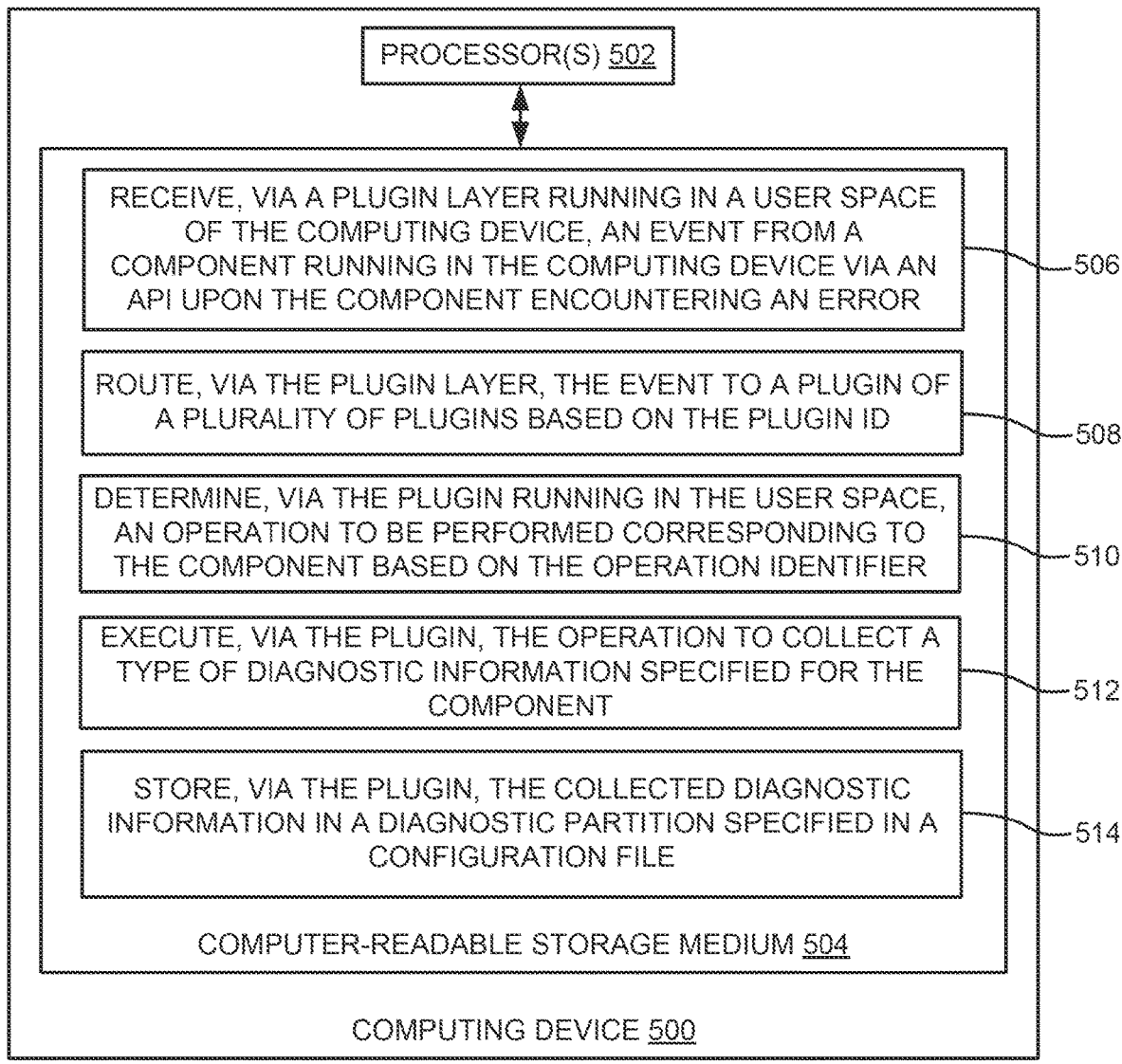
FIG. 5 is a block diagram of an example computing device including non-transitory computer-readable storage medium storing instructions to collect diagnostic information of a component running in the computing device.

FIG. 5 is a block diagram of an example computing device 500 including non-transitory computer-readable storage medium 504 storing instructions to collect diagnostic information of a component running in computing device 500. Computing device 500 may include a processor 502 and computer-readable storage medium 504 communicatively coupled through a system bus. Processor 502 may be any type of central processing unit (CPU), microprocessor, or processing logic that interprets and executes computer-readable instructions stored in computer-readable storage medium 504. Computer-readable storage medium 504 may be a random-access memory (RAM) or another type of dynamic storage device that may store information and computer-readable instructions that may be executed by processor 502. For example, computer-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 504 may be a non-transitory computer-readable medium. In an example, computer-readable storage medium 504 may be remote but accessible to computing device 500.

Computer-readable storage medium 504 may store instructions 506, 508, 510, 512, and 514. Instructions 506 may be executed by processor 502 to receive, via a plugin layer running in a user space of the computing device, an event from a component running in the computing device via an application programming interface (API) upon the component encountering an error. The event may include a plugin identifier and an operation identifier. In an example, the component may execute in a kernel space of computing device 500. In this example, instructions 506 to receive the event may include instructions to receive the event from the component executing in the kernel space via an uplink call from the component to the plugin layer. In another example, the component may execute in a user space of computing device 500. In this example, instructions 506 to receive the event may include instructions to receive the event from the component executing in the user space via a message passing protocol.

Instructions 508 may be executed by processor 502 to route, via the plugin layer, the event to a plugin of a plurality of plugins based on the plugin identifier. Instructions 510 may be executed by processor 502 to determine, via the plugin running in the user space, an operation to be performed corresponding to the component based on the operation identifier Instructions 512 may be executed by processor 502 to execute, via the plugin, the operation to collect a type of diagnostic information specified for the component. Instructions 514 may be executed by processor 502 to store, via the plugin, the collected diagnostic information in a diagnostic partition specified in a configuration file.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A computing device comprising:
a processor; and
a memory coupled to the processor, wherein the memory comprises a diagnostic daemon executing in a user space, and the diagnostic daemon comprising:
a plugin layer; and
a plurality of plugins communicatively connected to the plugin layer, each plugin is to perform at least one operation related to diagnostic data collection,
wherein the plugin layer is to:
receive an event from a component running in the computing device upon the component encountering an error, wherein the event is to include a plugin identifier and an operation identifier; and
route the event to a plugin of the plurality of plugins based on the plugin identifier; and
wherein the plugin is to:
determine an operation to be performed corresponding to the component based on the operation identifier; and
execute the operation to collect a type of diagnostic information specified for the component.

2. The computing device of claim 1, wherein the plugin is to store the collected diagnostic information in a diagnostic partition specified in a configuration file via a diagnostic information collection interface.

3. The computing device of claim 2, wherein the diagnostic daemon is to send a notification indicating a location of the diagnostic partition to a health agent residing in a server, wherein the health agent is to fetch the diagnostic information from the diagnostic partition to monitor health of the computing device at the time when the component encounters the error.

4. The computing device of claim 1, wherein the component executes in a kernel space configured in the memory, and wherein the diagnostic daemon is to receive the event from the component executing in the kernel space via an uplink call from the component to the diagnostic daemon.

5. The computing device of claim 1, wherein the component executes in a user space configured in the memory, and wherein the diagnostic daemon is to receive the event from the component executing in the user space via a message passing protocol.

6. The computing device of claim 1, wherein the memory comprises:
a configuration file to store information related to at least one operation supported by each plugin in the plurality of plugins, each operation is associated with an operation identifier.

7. The computing device of claim 6, wherein the diagnostic daemon is to:
determine the operation to be performed corresponding to the component by looking-up the operation identifier in the configuration file.

8. The computing device of claim 6, wherein the diagnostic daemon is to:
create the plurality of plugins based on plugin configuration specified in the configuration file, wherein each created plugin is to receive an event from at least one component via an application programming interface (API); and
assign a plugin identifier to each of the plurality of plugins.

9. The computing device of claim 1, wherein the plugin is a generic plugin providing a common service for a set of components including the component or a component-specific plugin providing services specific to the component.

10. The computing device of claim 1, wherein the diagnostic information comprises a point-in-time state of the computing device at the time of the error.

11. The computing device of claim 1, wherein the diagnostic daemon is to:
store the event including the plugin identifier and the operation identifier in a configuration file, wherein the diagnostic daemon is to map the collected diagnostic information in the diagnostic partition to a second component based on the stored event in response to receiving a second event from the second component.

12. A computer-implemented method comprising:
generating an event in response to an error condition encountered by a component of a computer, wherein the event is to include a plugin identifier and an operation identifier;
sending the event to a diagnostic daemon executing in a user space of the computer via an application programming interface (API);
routing, by the diagnostic daemon, the event to a plugin corresponding to the plugin identifier, wherein the plugin is to support at least one operation related to diagnostic data collection;
executing, by the diagnostic daemon, the plugin to:
determine an operation to be performed corresponding to the component based on the operation identifier; and
execute the operation to collect a type of diagnostic information specified for the component.

13. The computer-implemented method of claim 12, further comprising:
executing the plugin to:
access a configuration file to identify a location of the diagnostic partition; and
store the collected diagnostic information specified for the component in the location specified in the configuration file.

14. The computer-implemented method of claim 12, wherein routing the event to the plugin corresponding to the plugin identifier comprises:
receiving, via a plugin layer of the diagnostic daemon, the event from the component; and
routing, via the plugin layer, the event to the plugin corresponding to the plugin identifier.

15. The computer-implemented method of claim 12, wherein determining the operation to be performed comprises:
determining the operation to be performed corresponding to the component using a configuration file that stores mapping data between operation identifiers and operations related to the diagnostic data collection.

16. The computer-implemented method of claim 12, further comprising:
registering the plugin with the diagnostic daemon, comprising:
placing a configuration file in a location accessible to the diagnostic daemon;
creating, by the diagnostic daemon, a plugin for each plugin configuration specified in the configuration file;
assigning, by the diagnostic daemon, a plugin identifier defined in the configuration file to each created plugin; and assigning, by the diagnostic daemon, an operation identifier defined in the configuration file to each operation related to the diagnostic information collection supported by each plugin.

17. The computer-implemented method of claim 12, wherein the component is to execute in a kernel space of the computer or in a user space of the computer.

18. A non-transitory computer-readable storage medium comprising instructions executable by a processor of a computing device to:
  receive, via a plugin layer running in a user space of the computing device, an event from a component running in the computing device via an application programming interface (API) upon the component encountering an error, wherein the event is to include a plugin identifier and an operation identifier;
  route, via the plugin layer, the event to a plugin of a plurality of plugins based on the plugin identifier;
  determine, via the plugin running in the user space, an operation to be performed corresponding to the component based on the operation identifier;
  execute, via the plugin, the operation to collect a type of diagnostic information specified for the component; and
  store, via the plugin, the collected diagnostic information in a diagnostic partition specified in a configuration file.

19. The non-transitory computer-readable storage medium of claim 18, wherein the component executes in a kernel space of the computing device, and wherein instructions to receive the event comprise instructions to:
  receive the event from the component executing in the kernel space via an uplink call from the component to the plugin layer.

20. The non-transitory computer-readable storage medium of claim 18, wherein the component executes in a user space of the computing device, and wherein instructions to receive the event comprise instructions to:
  receive the event from the component executing in the user space via a message passing protocol.

* * * * *